United States Patent Office 3,054,269
Patented Sept. 18, 1962

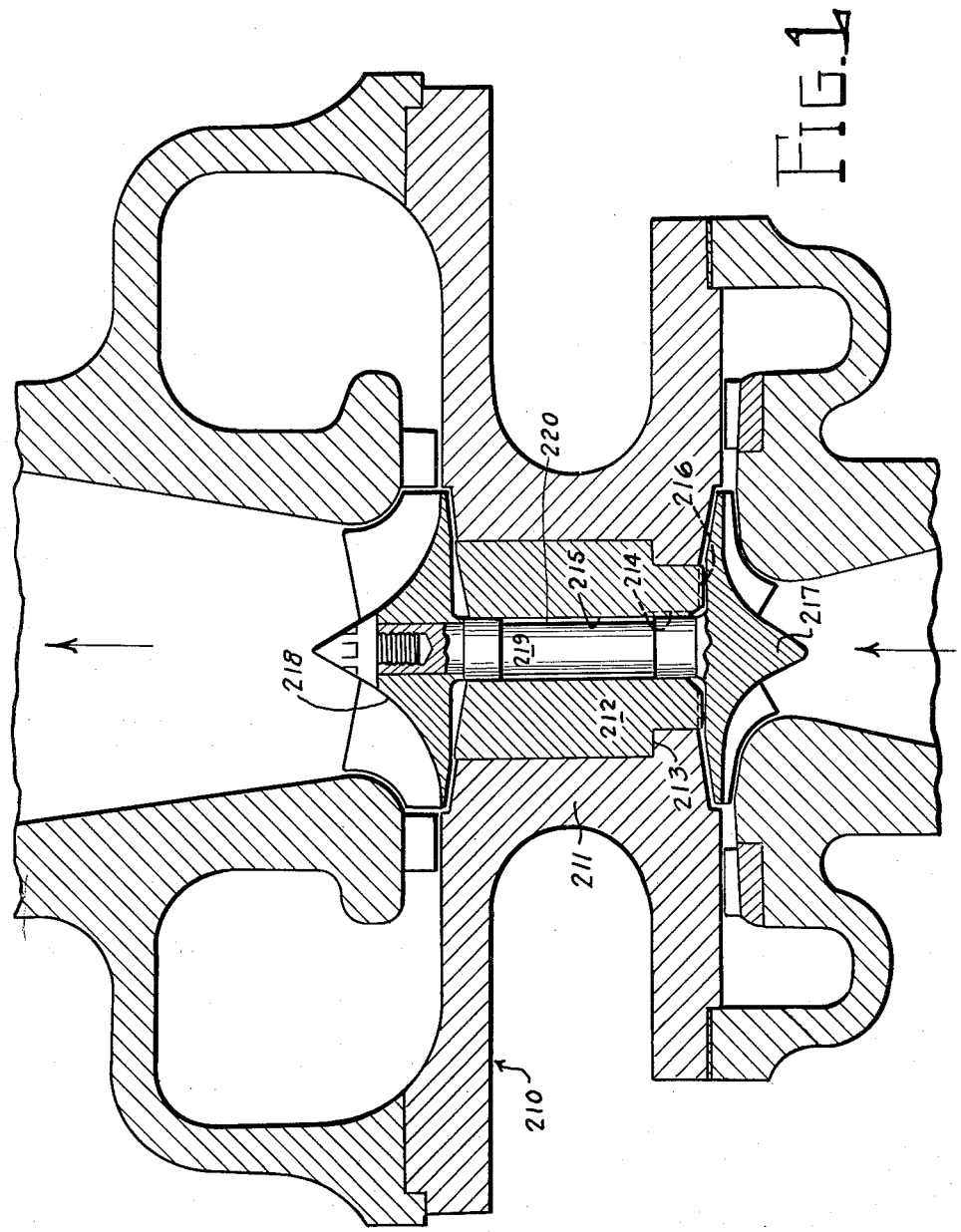

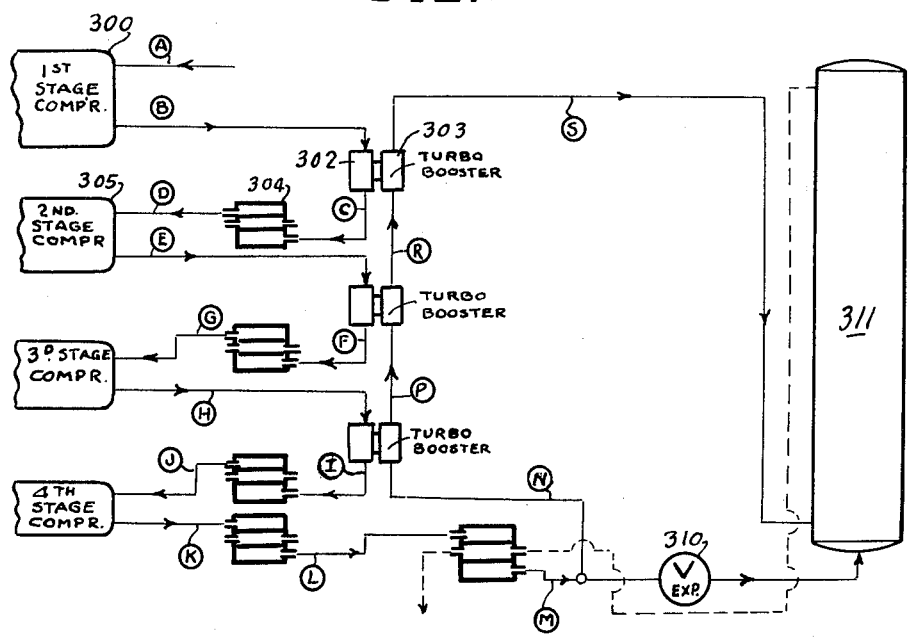

3,054,269
LIQUIFICATION OF GAS
William R. Crooks and John Fullemann, Mount Vernon, Ohio, assignors to The Cooper-Bessemer Corporation, Mount Vernon, Ohio, a corporation of Ohio
Original application June 29, 1956, Ser. No. 594,808, now Patent No. 2,929,548, dated Mar. 22, 1960. Divided and this application Feb. 17, 1960, Ser. No. 9,239
3 Claims. (Cl. 62—9)

This invention relates to a method of liquifying a gas with the aid of a high speed turbocompressor.

It has heretofore been considered impractical to build centrifugal compressors in a size range to handle gas flows much below 800 c.f.m. because of excessive gas friction in the narrow impeller passages that are required in so small a unit, and also because the speed of rotation is so high that the lubrication of bearings, gears and couplings becomes a major concern. Further, a centrifugal compressor operating at speeds higher than 20,000 r.p.m. to 30,000 r.p.m. presents a problem in connecting it to a power source, such as an electric motor or an internal combustion engine because it cannot be directly driven, but must be coupled to the power source by gearing or the like which will impart the necessary high rotative speed to the compressor from the low speed prime mover.

Where small flows of air or gas in the order of 15 c.f.m. to 200 c.f.m. are desired at pressure ratios of more than 1.5 to 1, compression has always been accomplished by reciprocating machine. The present invention makes it possible to utilize a rotating machine even for these small flows. The present invention is shown and described herein in an embodiment in which small flows at high pressures are produced.

The primary object of the present invention is to provide an improved method of liquifying gases by the use of a small, high speed turbocompressor.

Other objects and advantages of the invention will become apparent from the following specification, reference being had to the accompanying drawings, in which:

FIG. 1 is a central vertical sectional view of a modified turbocompressor suitable for use in the machine shown in FIG. 2; and FIG. 2 is a circuit diagram of a process for the manufacture of liquid oxygen in which turbocompressors constructed in accordance with the present invention are used.

A simple form of turbocompressor suitable for a method according to the invention is shown in FIG. 1. As there shown, a center stator element 211 is provided which is counterbored at its center to receive a balance collar 212 in the form of a thick walled tube of carbon or other low friction material. The outer surface of the tube is stepped as at 213 to seat in the stator at a definite axial location. At one end of the bore of the tube, a series of axial grooves 214 provide communication with a pressure chamber 215 which is formed in the bore by relieving a portion of the rotor shaft as hereinafter described. The grooves 214 are, in effect, continuations of radial grooves 216 formed in an end face of the bushing or collar 212, which grooves communicate with a source of gas under a pressure higher than any pressure existing at the opposite end of the rotor so that the flow of gas is always in the same direction from end to end of the bore of the collar or bushing.

The rotor, in the form shown, comprises a compressor wheel 217 and a turbine wheel 218 connected by a shaft 219. The rotor shaft fits the diameter of the collar or bushing very closely except for a relieved portion 220 which, with the adjacent stationary surface, forms the pressure chamber 215.

The rotor spins on an air bearing and centers itself in the bore of the bushing or collar 212, seeking its own axis of balance. Axially, the rotor is held in position by the flow of air from one end to the other and if the rotor tends to move to close off the space between the back of the turbine wheel 218 and the adjacent surface of the collar 212, the restriction to flow of air out of chamber 215 will cause the pressure to increase and cause the rotor to move outwardly to reestablish the proper flow space. The pressure drop across the end of the collar 212 in this instance is the difference between the compressor discharge pressure (110 p.s.i.g.) and the turbine inlet pressure which is about 42 p.s.i.g. In this form also, the effective areas of the inner and outer faces of the two wheels and the pressures existing thereon are equated at the respective ends of the rotor.

FIG. 2 shows schematically a system for the liquification of oxygen in which turbocompressors according to the present invention are advantageously employed. As there shown, gas is taken into a first stage reciprocating compressor 300 and compressed, passing then to a first centrifugal booster 302 driven by a turbine 303. The booster 302 and turbine 303 form a turbocompressor constructed in accordance with the present invention and may be made specifically as shown in FIG. 1, since the energy extracting portion, or turbine, may be single stage. From the booster 302 the gas passes through a heat exchanger 304 to a second reciprocating compressor stage 305. Repeated stages of compression in reciprocating units, coupled with boosting in centrifugal units, followed by cooling in heat exchangers brings the gas at relatively high pressure and medium temperature to a final point where a portion of the gas is split off to expand successively in the turbines of the turbocompressor units while the remainder passes through an expansion valve 310 to a collection tower 311 in which the oxygen is collected at low temperature and low pressure, the temperature being so low that the oxygen exists as a liquid. The temperatures, pressures and flow volumes at the several points in the cycle or "states" are as shown in the following table. On the drawing the "states" are designated by encircled letters, the lead lines running to the pipes or conduits in which the gas in the designated state exists. It will be noted that the flow of gas in cubic feet per minute is very small in certain of the stages; far below that which can be successfully passed through known rotary machines. It will also be noted that the energy extracted from the gas for operation of the turbines not only lowers the temperature of the gas but is returned to the system in the form of energy of compression in the booster units.

Table 1

| State | Pressure (p.s.i.a.) | Temp. (° R.) | Temp. (° F.) | Flow (lbs.) | Flow c.f.m. at actual conditions |
|---|---|---|---|---|---|
| A | 14.5 | 555 | 95 | 530 | 7,525 |
| B | 51.1 | 806 | 346 | 530 | 3,115 |
| C | 57 | 840 | 380 | 530 | 2,965 |
| D | 55.5 | 570 | 110 | 530 | 2,080 |
| E | 196 | 815 | 355 | 530 | 885 |
| F | 2,205 | 852 | 392 | 530 | 835 |
| G | 218 | 570 | 110 | 530 | 572 |
| H | 768 | 815 | 355 | 530 | 276 |
| I | 863 | 852 | 392 | 530 | 262 |
| J | 858 | 570 | 110 | 530 | 192.5 |
| K | 3,025 | 815 | 355 | 530 | 58.2 |
| L | 3,010 | 570 | 110 | 530 | 38.8 |
| M | 2,975 | 500 | 40 | 530 | 32.9 |
| N | 2,970 | 500 | 40 | 265 | 16.5 |
| P | 1,275 | 413 | −47 | 265 | 62 |
| R | 425 | 313 | −147 | 265 | 86.7 |
| S | 105 | 227 | −233 | 265 | 206 |

This is a division of United States application Serial No. 594,808, June 29, 1956, now Patent No. 2,929,548 for "Turbocompressor."

Various modifications of the above described embodiment of the invention and, in particular, of the turbocompressor can be made without departing from the scope of the invention, if such modifications are within the spirit and tenor of the appended claims.

We claim:

1. A method of liquifying gas which comprises compressing a supply of gas, in a first stage of a main compressor, feeding the gas to a compressor portion of a first turbocompressor to compress the gas further, cooling the gas to a temperature approximating that of the gas before compression, further compressing the gas in a sequential stage of the main compressor, feeding the gas to a compressor portion of another turbocompressor to compress the gas still further, again cooling the gas, repeating the last three steps until the gas is compressed to a predetermined pressure with the temperature thereof approximating that of the gas before compression, dividing the gas into two portions, expanding a first portion of the gas to lower the temperature and the pressure thereof, directing a second portion of the compressed gas sequentially through turbine portions of said turbocompressors in the reverse order in which the gas was fed to them during compression to drive said turbocompressors and to expand the second portion to lower the temperature and the pressure thereof, and recombining the first and the second portions of the gas.

2. Apparatus for liquifying a gas comprising a multistage reciprocating compressor, means for feeding gas to be liquified to a first stage of said reciprocating compressor, a first turbocompressor having a turbine portion and a compressor portion, means for feeding the gas from the first stage of said reciprocating compressor to said compressor portion, means for cooling the compressed gas, means for feeding the compressed gas to a sequential stage of said reciprocating compressor, an additional turbocompressor having a turbine portion and a compressor portion, means for feeding gas from said sequential stage of said reciprocating compressor to the compressor portion of said additional turbocompressor, means for dividing the gas into two portions after being compressed by said reciprocating compressor and said turbocompressors, an expansion valve, means for feeding one portion of the gas through said expansion valve to lower the temperature and the pressure thereof, and means for feeding the other portion of the gas sequentially through said turbine portions of said turbocompressors to drive said compressor portions and to lower the temperature and the pressure of said other portion of the gas to approximately the reduced pressure of the gas emerging from said expansion valve.

3. Apparatus according to claim 2 wherein said turbocompressors have connecting shafts between the turbine portions and the compressor portions and means for effecting a flow of gas around said connecting shafts from said compressor portions toward said turbine portions for rotatably supporting said shafts.

References Cited in the file of this patent

UNITED STATES PATENTS

| | | |
|---|---|---|
| 2,509,034 | Claitor et al. | May 23, 1950 |
| 2,529,880 | McClure | Nov. 14, 1950 |
| 2,705,406 | Morrison | Apr. 5, 1955 |
| 2,713,781 | Williams | July 26, 1955 |
| 2,799,997 | Morrison | July 23, 1957 |
| 2,922,285 | Rae | Jan. 26, 1960 |
| 2,941,374 | Morrison | June 21, 1960 |

FOREIGN PATENTS

| | | |
|---|---|---|
| 735,906 | Germany | June 1, 1943 |